United States Patent [19]

Haley et al.

[11] Patent Number: 5,087,177
[45] Date of Patent: Feb. 11, 1992

[54] DUAL CAPACITY FLUID PUMP

[75] Inventors: William J. Haley, Ithaca; Glenn E. Swanson, Lansing, both of N.Y.

[73] Assignee: Borg-Warner Automotive, Inc., Sterling Heights, Mich.

[21] Appl. No.: 589,045

[22] Filed: Sep. 27, 1990

Related U.S. Application Data

[63] Continuation-in-part of Ser. No. 429,595, Oct. 31, 1989, abandoned.

[51] Int. Cl.$^5$ .............................................. F04B 49/08
[52] U.S. Cl. ..................................... 417/426; 417/288
[58] Field of Search ................. 417/62, 279, 286, 288, 417/426, 427, 428

[56] References Cited

U.S. PATENT DOCUMENTS

| 2,685,404 | 8/1954 | Wohlmeyer. | |
|---|---|---|---|
| 3,046,899 | 7/1962 | Biefang. | |
| 3,337,195 | 8/1967 | Farison. | |
| 3,692,432 | 9/1972 | Liang et al. | 417/286 |
| 4,204,811 | 5/1980 | Carter et al. | 417/288 |
| 4,245,964 | 1/1981 | Rannenberg | 417/287 |
| 4,316,875 | 2/1982 | Barth et al. | |
| 4,347,765 | 9/1982 | Leonard et al. | 74/869 |
| 4,391,568 | 7/1983 | Tenney. | |
| 4,478,043 | 10/1984 | Kobayashi et al. | 417/286 |
| 4,502,845 | 3/1985 | Chana | 417/288 |
| 4,850,813 | 7/1989 | Fisher | 417/288 |

FOREIGN PATENT DOCUMENTS

3402448 7/1975 Fed. Rep. of Germany.
904757 11/1945 France.

Primary Examiner—Louis J. Casaregola
Assistant Examiner—David L. Cavanaugh
Attorney, Agent, or Firm—Brooks & Kushman

[57] ABSTRACT

A dual capacity pump having at least two gear pump stages with a common fluid inlet passage, each pump stage having a discharge port, the discharge port for one stage communicating with a fluid pressure load through a flow delivery passage and the discharge port for the other stage communicating with the flow delivery passage through a one-way flow valve, and flow control valve means responsive to an operating variable for connecting the discharge side of the other stage to the common fluid inlet passage during operation in a first operating range of low driving speeds for the pump and to said flow delivery passage through the one-way flow valve during operation in a calibrated range of values for the operating variable.

8 Claims, 5 Drawing Sheets

DUAL CAPACITY FLUID PUMP

REFERENCE TO RELATED DISCLOSURE

This disclosure is a continuation-in-part of my patent application Ser. No. 429,595, filed Oct. 31, 1989, now abandoned which is assigned to the assignee of the present invention.

FIELD OF THE INVENTION

Our invention relates generally to positive displacement gear pumps that are adapted particularly to be used in a control system for an automatic transmission for an automotive vehicle wherein the operating speed range of the pump extends from a low speed value corresponding to an engine idle condition to a high speed value corresponding to operation of the vehicle engine under high speed cruising conditions.

BACKGROUND ART

Our invention is adapted for use in a structural environment such as that described in U.S. Pat. No. 4,347,765 which comprises a transmission having a hydrokinetic torque converter and multiple-ratio, compound, planetary gearing. The relative motion of the elements of the gearing is controlled by fluid pressure operated clutches and brakes. Fluid pressure operated servos are used to selectively engage and release the clutches and brakes to effect ratio changes.

In the transmission disclosed in the '765 patent, the lowest ratio is used for accelerating from a standing start. The overall torque multiplication ratio of the transmission decreases until a final fourth ratio, which is an overdrive ratio, is obtained. The ratio changes are accomplished by an automatic control valve system. That system selectively distributes pressure from a fluid pressure pump to the fluid pressure operated servos for engaging and releasing the clutches and brakes.

The transmission pump disclosed in the '765 patent is a positive displacement gear pump located in a pump body secured to the transmission housing intermediate the hydrokinetic torque converter and the multiple ratio gearing. The torque input element of the positive displacement pump is connected drivably to the impeller of the hydrokinetic torque converter. It, in turn, drivably engages a second gear element of the positive displacement pump.

The operating speed range for the transmission of the '765 patent varies from engine idle speed to highway speed, the latter usually being a multiple of up to ten times the idling speed. When the vehicle is operating at low speeds and the engine throttle for the vehicle is advanced as the vehicle accelerates from a standing start, the torque converter impeller speed is higher than the idling speed but is still substantially lower than the final cruising speed of the engine experienced under steady state highway driving conditions.

A relatively high control circuit pressure must be maintained by the pump, especially during acceleration from a standing start with advanced throttle. It is under those conditions that the torque transfer requirements for the gearing and the fluid pressure operated servo are at a maximum, and substantial energy is required to drive the pump. This is sometimes referred to as a parasitic loss. The capacity of the pump must be designed, therefore, so that it is large enough to accommodate the maximum flow and pressure requirements when the demands on the pump are greatest. This necessarily results in excessive capacity for the pump when the vehicle is operating at high speeds under cruising conditions and the pressure and fluid flow requirements of the servos are less.

We are aware of attempts that have been made to solve the problem of excess pumping capacity in transmission pumps for automatic transmissions. One example is shown in U.S. Pat. No. 4,502,845 where a multistage gear pump and control valve arrangement is provided. That gear pump comprises a main drive gear that meshes with two secondary gears to define two pumping stages. The secondary pump is relieved of the burden of supplying circuit pressure by connecting the secondary pump to a low pressure sump region through a regulator valve. When the flow requirements of the pump are less, the valve responds to a pressure buildup on the downstream side of a control orifice. Upon an increase in the pump speed, the valve regulates the pressure in the discharge passage causing the discharge side of the secondary pump to become exhausted to the common sump, thereby reducing the pumping horsepower when the flow requirements are reduced.

Another prior art teaching is shown in U.S. Pat. No. 4,204,811, which discloses a compound pump with two independent gear pumps and a common driver. The pump is capable of supplying both a high pressure circuit with low flow requirements and a low pressure circuit with high flow requirements. A priority valve in a bypass flow path from the high pressure side of the pump assembly supplements the flow requirements of the low pressure load. The pump itself includes a pair of gear pumps with a common driver as in the case of the pump of U.S. Pat. No. 4,502,845.

Other prior art teachings attempt to compensate for a reduced pumping requirement by providing a bypass valve for one of a pair of pumping gears. The bypass valve acts in response to a delivery pressure signal so that there is a reduced pump power demand as one of the pumps operates against zero pressure rather than against circuit pressure. An example of this arrangement is shown in U.S. Pat. No. 4,245,964.

In prior art German patent publication DE 3402448, a compound pump has two pumping stages. The delivery rate is controlled by a flow control valve that connects the output of each pump stage to a common delivery line at low pump speeds so that the pump stages act in parallel. At high pump speeds, the valve connects the pump stages in series so that the output of one stage supplies the inlet of the other stage.

Prior art U.S. Pat. No. 3,692,432 describes a prior art compound pump wherein a regulator valve at the outlet side of one pump stage causes a pressure build-up at its inlet side, thus rendering that stage inactive while the pressure and flow requirements of the load are satisfied by the other pump stage.

Prior art U.S. Pat. No. 4,850,813 discloses a multiple stage pump system that is adapted to supply a circuit having separate regions of various pressure levels. As the flow requirements of one circuit region are satisfied, one or more of the pump stages is deactivated as its pumping function is taken over by another pump stage. Thus, each circuit region is continuously supplied with pressurized fluid with the fewest possible number of pumping stages.

French patent 904,757 describes a compound pump wherein an actuator controls a double position flow control valve that causes the output of one pump stage to be bypassed to the pump supply when the actuator responds to an increase in pump output pressure.

DISCLOSURE OF THE INVENTION

Our invention is distinguishable from the foregoing prior art disclosures since it has a simplified flow control valve and a dual stage positive displacement pump assembly wherein the discharge side of one pump is adapted to be connected to the discharge side of a second pump at low speeds. The discharge side of the second pump is adapted to be connected to its inlet side, however, when the flow control valve is shuttled from one position to the other. Upon an increase in the pump driving speed, the second pump operates against a zero net pressure differential, thereby substantially reducing the horsepower required to drive the pump assembly.

Because excess fluid is not pumped at high pump speeds against a high pressure, the fluid passages may be downsized. This feature results in an economy of space and a reduced manufacturing cost.

We have provided a simplified means for obtaining a pump speed signal. According to one embodiment of the invention, this includes a pair of simple flow control pump gears having a minimal power demand. These pump gears define a small capacity pump that communicates at its inlet side with the intake side of the main positive displacement pumping stages. The outlet side of the flow control pump gears communicates with a flow control valve as well as with a controllable orifice between the discharge side of the flow control pump gears and the exhaust region. Thus, the pressure developed on the discharge side of the flow control pump gears depends upon the driving speed because the pressure differential across the controllable orifice will increase as the flow control pump gear speed increases. If the flow control pump gear speed is in excess of a predetermined value, the flow control valve will shuttle to a position that will allow the discharge side of one of the main gear pumping stages to become connected to the common inlet for the main pumping stages. The flow control pump gears are driven at a speed that is proportional to the speed of the main pump gears.

When the pump speed increases beyond a calibrated value, the flow control valve responds to the increased flow to exhaust one side of one of the sets of main pumping gears so that only a single pumping stage supplies the pressure requirements.

Our simplified valve arrangement makes it unnecessary to provide complex circuit bypass valve structure of the kind shown in the prior art. The flow control pump gears have minimal flow requirements and have only a minimal pumping loss compared to the horsepower savings that is effected by rendering one of the main pumping gear stages inactive at high speeds beyond a transition speed value.

The improved dual capacity pump of this embodiment of our invention is self-compensating for changes in viscosity resulting from changes in oil temperature. Normally, in a transmission system of this kind, fluid leakage in the valve circuit associated with the transmission pump increases as the operating temperatures increase. Furthermore, the leakage bypass flow around the pump gears increases as the operating temperatures increase. The flow control pump gears of our invention may be designed so that the coefficient of thermal expansion of the material of which the flow control pump gears are formed may match the coefficient of thermal expansion of the main gears. For example, a suitable molded resin or plastic may be used. Thus, an increase in temperature will delay the response of the flow control valve to an increase in the speed of the flow control pump gears. This is a desirable characteristic because any delay in the response of the flow control valve resulting from increased bypass flow across the flow control pump gears will occur under the same conditions that cause an increase in the flow requirements of the transmission circuit itself and the leakage flow of the main pump gears. The change in the shift point at which the flow control valve will shuttle from one position to the other thus provides an inherent compensation for changes in the flow requirements because of fluid viscosity changes.

Only a very small outlet pressure is required at the outlet port for the flow control pump gears in a transmission environment. For automotive vehicle transmissions, the pressure may be a low as 10-15 psi. The horsepower required to drive the flow control pump gears, therefore, is very small.

The opportunity for a malfunction of the pump assembly is reduced because of the simplicity of the design itself in comparison to the rather complex circuit designs of the prior art.

In an alternate embodiment of the invention, a control signal for effecting a transition from one pumping mode to the other is obtained by means of a solenoid controlled orifice valve that controls a pressure build-up in a signal passage that communicates with a transition valve that in turn directs the output pump flow from one pump stage to a common outlet flow passage or to the inlet side of that pump stage. As in the case of the first embodiment, the pressure signal in the signal passage is triggered independently of the pump flow itself. The valve may respond, for example, to a vehicle speed measuring mechanism or an engine speed sensor in the case of an engine powered vehicle. If the pump is used in a multiple ratio transmission mechanism for an engine powered vehicle, the orifice valve may be made sensitive to transmission ratio changes so that only one pump stage is active during operation at high ratios and both stages are operable during operation in lower speed ratios. In any case, the transition from one mode to the other depends on extraneous operating variables that are essentially independent of the output flow and output pressure of the pump stages. This is a characteristic that is common to both embodiments.

BEST MODE FOR CARRYING OUT THE INVENTION

Figure 1:
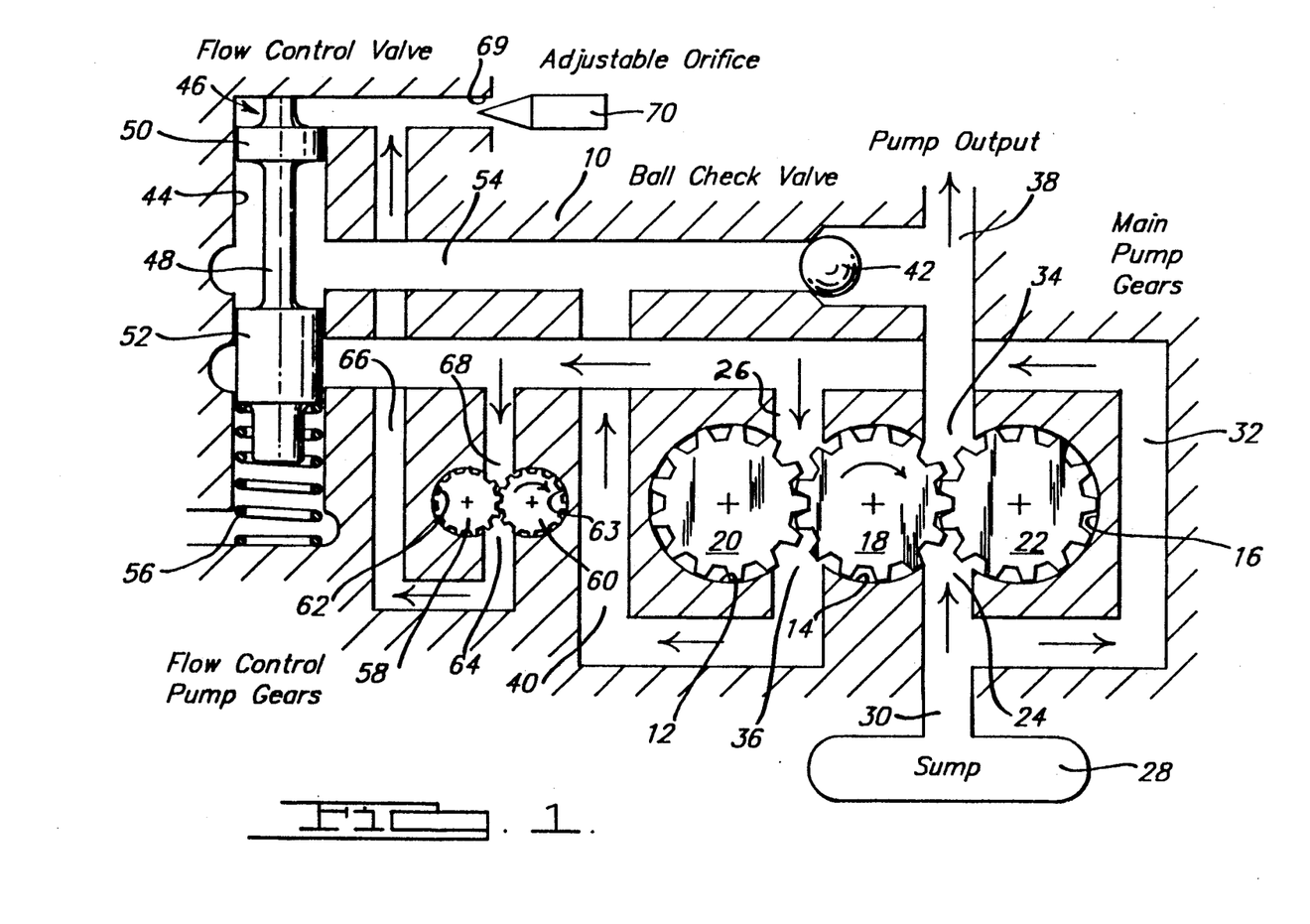
FIG. 1 is a cross-sectional view in schematic form showing a first embodiment of the invention including pump gears of a dual stage pump assembly of the kind that may be used in a transmission circuit, particularly the kind shown in reference U.S. Pat. No. 4,347,765. The flow control valve shown in FIG. 1 is in a low speed condition.
Figure 2:
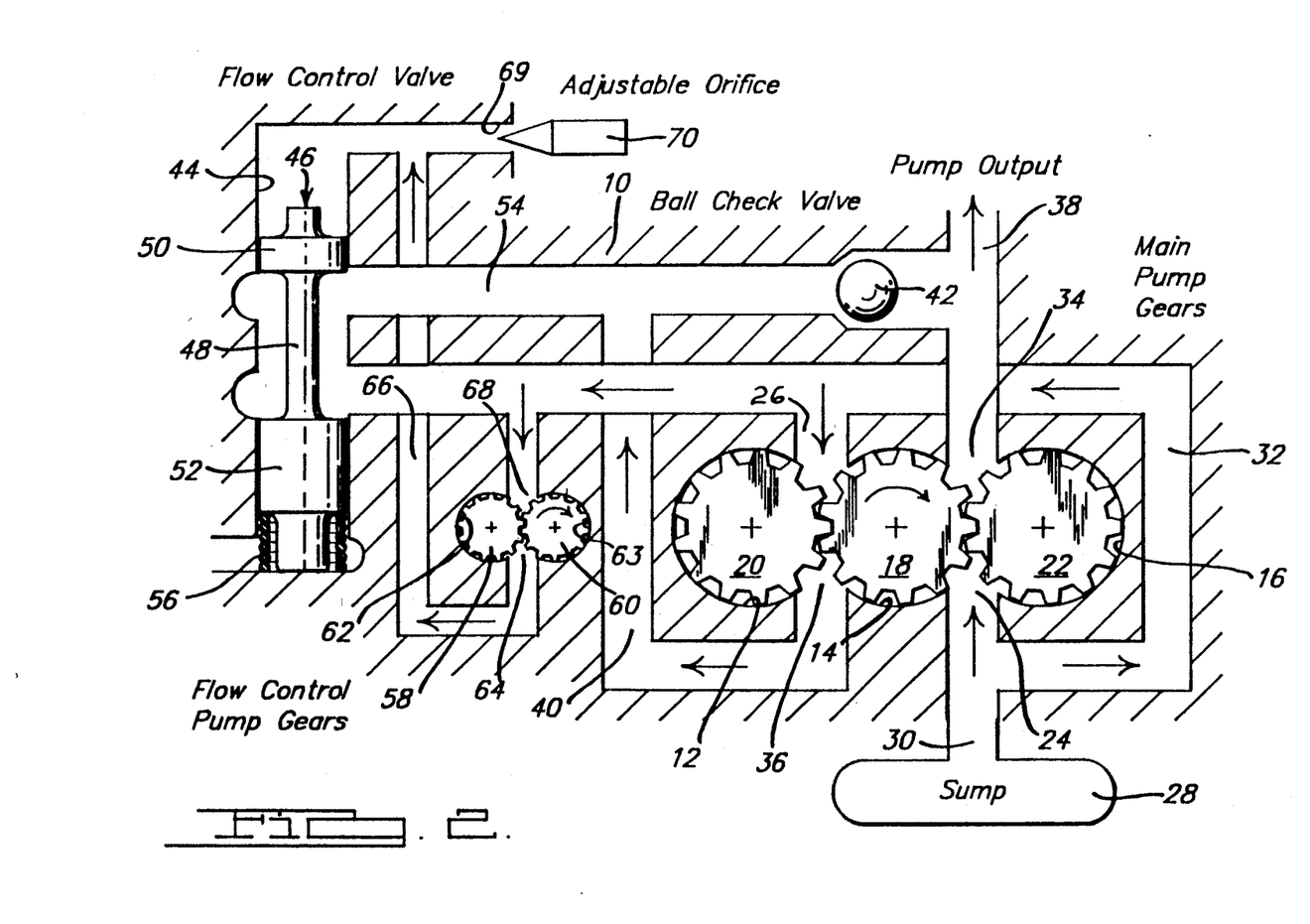
FIG. 2 is a view similar to FIG. 1, although the flow control valve has been shuttled to its high speed position.

Numeral 10 in FIGS. 1 and 2 designates generally a pump housing. FIGS. 1 and 2 of the drawings show a schematic representation of a pump housing for a transmission of the kind shown in the '765 patent, although the pump of the '765 patent is a crescent gear pump with internal and external pump gears rather than an external gear pump as shown in the drawings. The housing of our pump is provided with three pump gear openings 12, 14 and 16 which are cylindrical openings having their geometric central axes in spaced, parallel relationship. The openings overlap, as indicated in the drawings, so that opening 14 and opening 12 have common portions. The same is true of the pair of openings 14 and 16, which overlap at a common region.

Opening 14 receives an external gear pump element 18. Corresponding external gear pump elements 20 and 22 are received in openings 12 and 16, respectively. Element 18 serves as a pump driving element that is connected to a torque input element of the transmission, such as a torque converter impeller, which is driven by the internal combustion engine.

Element 18 drivably engages elements 20 and 22 to provide a pumping action. It is driven in the direction of the arrow in FIGS. 1 and 2. Each pair of the gears 18, 20 and 22 has a pump inlet and a pump outlet. The pump inlet for the pair of gear elements 18 and 22 is shown at 24 and the corresponding pump inlet for the pair of gear elements 18 and 20 is shown at 26.

A low pressure sump 28 communicates with inlet 24 through passage 30, which communicates with inlet 26 through passage 32.

The high pressure fluid delivery port for the pair of gear elements 18 and 22 is shown at 34. A corresponding high pressure delivery port for gear element pair 20 and 18 is shown at 36. Delivery port 34 communicates with pressure delivery passage 38, which may communicate with a control valve system for an automatic transmission or the like. The delivery port 36 for the gear element pair 18 and 20 communicates through passage 40 with the passage 38 through one-way flow check valve 42. This valve comprises a valve element that is seated on an annular seat so that flow from passage 38 to passage 40 is prevented, although flow in the opposite direction from passage 40 to passage 38 is permitted.

Passage 40 communicates with valve chamber 44 of a flow control valve or transition valve shown generally at 46. Valve 46 comprises a valve spool 48 having spaced valve lands 50 and 52. Communication between valve opening 44 and passage 40 is provided by branch passage 54.

Valve spool 48 is biased in an upward direction, as shown in the drawings, by valve spring 56. When it is in the position shown in FIG. 1, low pressure supply passage 32 is blocked by valve land 52. Thus, no communication is established between the supply side of the pair of gear pump elements 18 and 20 and passage 54. If the valve spool is shifted in a downward direction as indicated in FIG. 2, communication is established between the supply side of the gear pump elements 18 and 20 and passage 54. Thus, the high pressure side of the gear pump elements 18 and 20 communicates with the low pressure sump, and fluid pumped by the pump gear elements 18 and 20 is circulated from port 36 to the port 26 under minimal pressure. There is only minimal pressure differential created by reason of the pumping action of the gear pump elements 18 and 20.

A pair of flow control pump gears 58 and 60 is connected drivably to the converter impeller or to the driving pump gear element so that they are driven at speeds proportional to engine speed. These pump gears are situated in cooperating pump gear cavities 62 and 63. When the flow control pump gears rotate in the direction indicated by the arrow, fluid is delivered to pump outlet port 64 and to control pressure passage 66. Inlet port 68 for the flow control pump gears communicates with the low pressure passage 32 that communicates with the sump 28. Control pressure passage 66 is isolated from the pump delivery passage 38 and is separately pressurized with a pressure signal that is received by the flow control valve 46.

Control pressure passage 66 communicates with valve chamber 44 at the upper side of land 50 thereby establishing a control pressure force that opposes the force of the spring 56. Control pressure passage 66 communicates with adjustable control orifice 69. An adjustable valve element 70 registers with the orifice 69 so that the effective size of the orifice can be controlled.

As the driven speed of the flow control pump gears increases, the flow through control pressure passage 66 increases. An increase in flow in passage 66 will result in an increase in the pressure in passage 66 because of the flow restriction at adjustable flow control orifice 69. The increase in pressure results in an increasing force on the valve element 48. When the force of the spring 56 is overcome by the force of the pressure in control pressure passage 66, the spring will yield, thereby establishing communication between pressure supply passage 32 and passage 54. This bypasses the fluid delivered by the pair of gear pump elements at 18 and 20.

As soon as passage 54 communicates with the low pressure passage 32, check valve 42 closes so that fluid is supplied to the pressurized delivery passage 38 only by the single pair of gear pump elements 18 and 22. This condition is seen in FIG. 2.

Prior to the time that flow control valve element 48 is shifted, both pairs of gear pump elements contribute to the flow delivery at passage 38. After the transition point is reached at which time valve element 48 is shifted, the pumping horsepower required to drive pump gear element pair 18 and 20 is reduced to substantially zero. That is the condition indicated in FIG. 2. The point at which that transition occurs can be controlled by appropriately adjusting valve element 70 to vary the size of the flow control orifice 69.

If the temperature of the oil is high, the leakage around the flow control pump gears is higher than it is when the oil is cold. Thus, the flow control pump gears must be driven at a higher speed to effect a sufficient pressure at the flow control valve to shift the valve element 48 to the position shown in FIG. 2. The effective temperature of the fluid pumped by the flow control pump gears is the same generally as the effective temperature of the fluid at the main pump gears. Thus, at high temperatures the bypass flow around the pump gear elements 20, 18 and 22 is increased. Furthermore, the leakage in the valve circuit from the transmission is higher when the temperature is higher, so a greater volume of fluid must be delivered to passage 38 when the temperature is high than when it is cold. It is desirable therefore, for the transition point at which the valve element 48 is shifted to be higher when the temperature is higher. This is exactly the effect that is achieved because, as mentioned previously, the flow control pump gears must be driven at a higher speed to effect a transition from the tandem pumping mode to the single stage pumping mode at high temperatures.

Ideally, the coefficient of thermal expansion of the material of which the flow control pump gears are formed should be slightly larger than the coefficient of thermal expansion of the material of which the main pump gears are formed. Then there will be over-compensation for temperature changes to accommodate for increased leakage in the control valve system as temperature increases. The flow control pump gears may be made by an inexpensive plastic molding process since the differential pressure on which they are required to act is rather minimal. For example, the maximum pressure developed by the flow control pump gears may be only 10 or 15 psi whereas the maximum pressure developed by the main pump gears may be as high as 300 psi.

Figure 4:
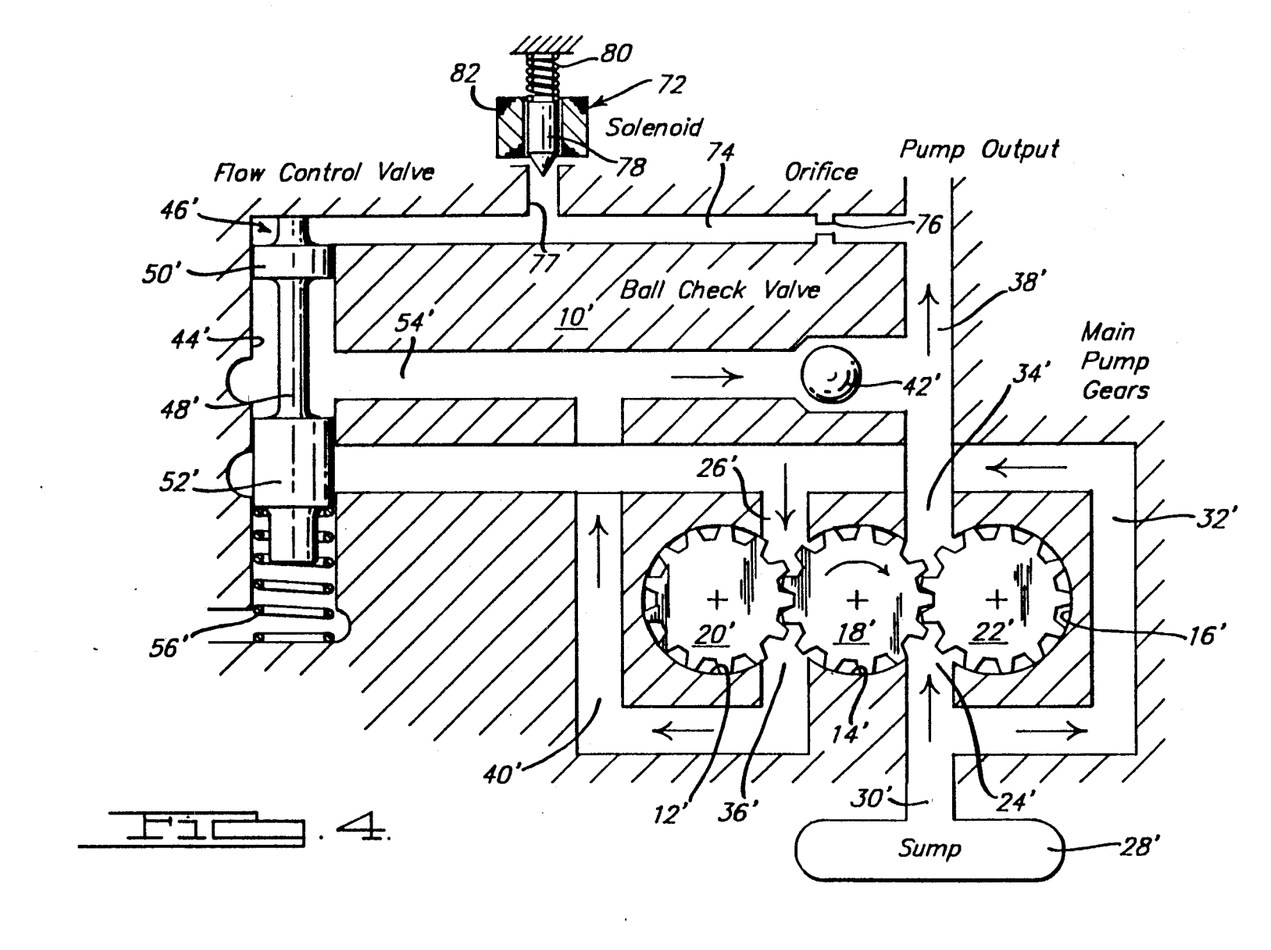
FIG. 4 is a cross-sectional view in schematic form showing a second embodiment of the invention including two pump stages that are controlled by an orifice valve operator for the transition valve. The flow control valve is shown in its low speed position.
Figure 5:
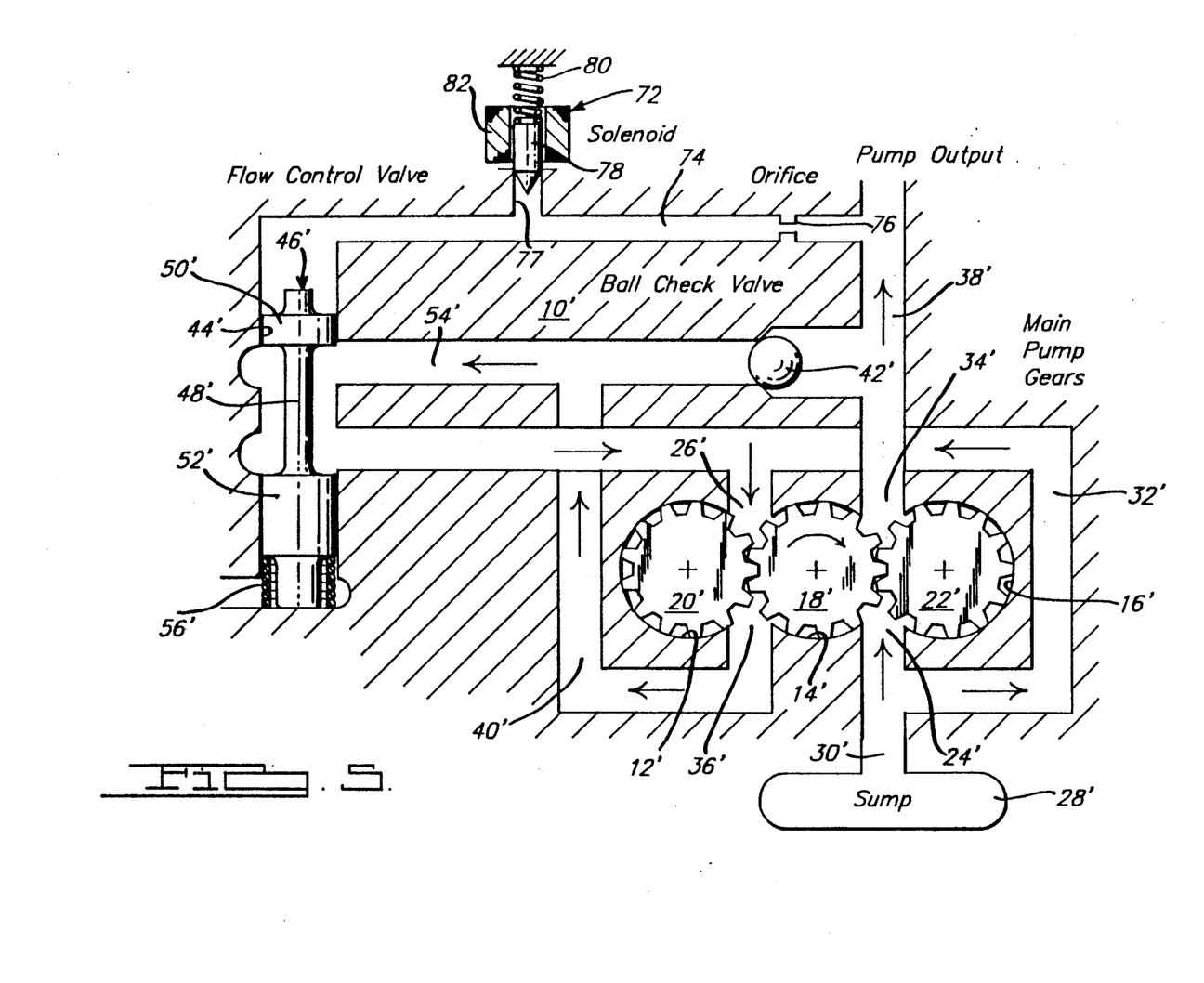
FIG. 5 is a view similar to FIG. 4, although the flow control valve has been shuttled to its high speed position.

The embodiment of FIGS. 4 and 5 does not include the flow control pump gears 58 and 60. The pressure signal obtained by the pump gears 58 and 60 of the embodiment of FIGS. 1 and 2 is obtained instead by means of a solenoid-operated valve shown generally at 72 in FIGS. 4 and 5.

In the embodiment of FIGS. 4 and 5, a pressure signal passage 74 extends from the upper end of flow control valve chamber 44' to one side of a flow control orifice 76, the latter communicating with pump outlet delivery passage 38'. The structural features of the embodiment of FIGS. 4 and 5 that have counterpart elements and the embodiment of FIGS. 1 and 2 have been identified by reference characters similar to those used in the description of FIGS. 1 and 2, although prime notations have been added.

In the embodiment of FIGS. 4 and 5, a pressure signal is established in passage 74 when solenoid valve 72 closes exhaust port 77. Solenoid valve 72 comprises a valve element 78 that registers with exhaust port 77 and closes the port when it is urged by spring 80 in a downward direction as viewed in FIGS. 4 and 5. The valve is retracted by electromagnetic forces developed by the solenoid windings 82.

When the valve 72 opens the port 77, the pressure in passage 74 is relieved. Thus, the spring 56' shifts the shuttle valve 46' in an upward direction, thereby blocking communication between passages 32' and 54'. The discharge side of the pump stage 18', 20' then delivers pressurized fluid through passage 40' and past the check valve 42' to the common delivery passage 38'. This condition may exist, for example, when the engine speed is low or the vehicle speed is low. It may exist also when the flow requirements of the pump are reduced for some other reason.

When the valve 72 closes the port 77, a pressure build-up occurs in passage 74. This causes a pressure build-up on the upper side of the land 50' of the flow control valve 46', thereby shifting the valve 46' in a downward direction against the force of spring 56'. This connects passage 32' with passage 54'. Thus, the pressure on the left side of the check valve 42' is lowered, thereby allowing the valve 42' to close. The pressure differential across the secondary pump stage 18', 20' then is eliminated and pressure is delivered to the output passage 38' only by the pump stage 18', 22'.

In the embodiment of FIGS. 1 and 2, on the one hand, and in the embodiment of FIGS. 4 and 5 on the other hand, a transition from one pumping mode to the other is obtained by a signal that depends upon the operating conditions. Those operating conditions may be engine speed or vehicle speed. In the case of an engine powered vehicle, the transition from one stage to the other in the embodiment of FIGS. 4 and 5 may also be made in response to a change in ratio in the case of a vehicle having a multiple ratio power transmission mechanism. Thus, the solenoid valve may be actuated to close when the transmission is shifted to the highest ratio in the range of ratios available in the transmission, and it may be opened when the transmission is operated in the lowest ratio or in any other underdrive ratio between the lowest ratio and the highest ratio. These operating conditions are independent of the fluid delivery characteristics of the two pumping stages.

The pressure of the fluid delivered in the common outlet passage 38' will depend upon variables such as the leakage in the control valve circuit of which the pump system is a part or to the magnitude of various pressure loads that are served by the pump system, or even to a combination of variables including the driving speed of the pump gears themselves. The transition from one pumping stage to the other, however, is independent of the variables that directly affect the pump. The transition from one stage to the other is dependent in each of the embodiments of our invention on operating variables of the overall driveline. The transition point is independent of the flow delivered to the pump outlet circuit through the passages 38' or 38.

Figure 3:
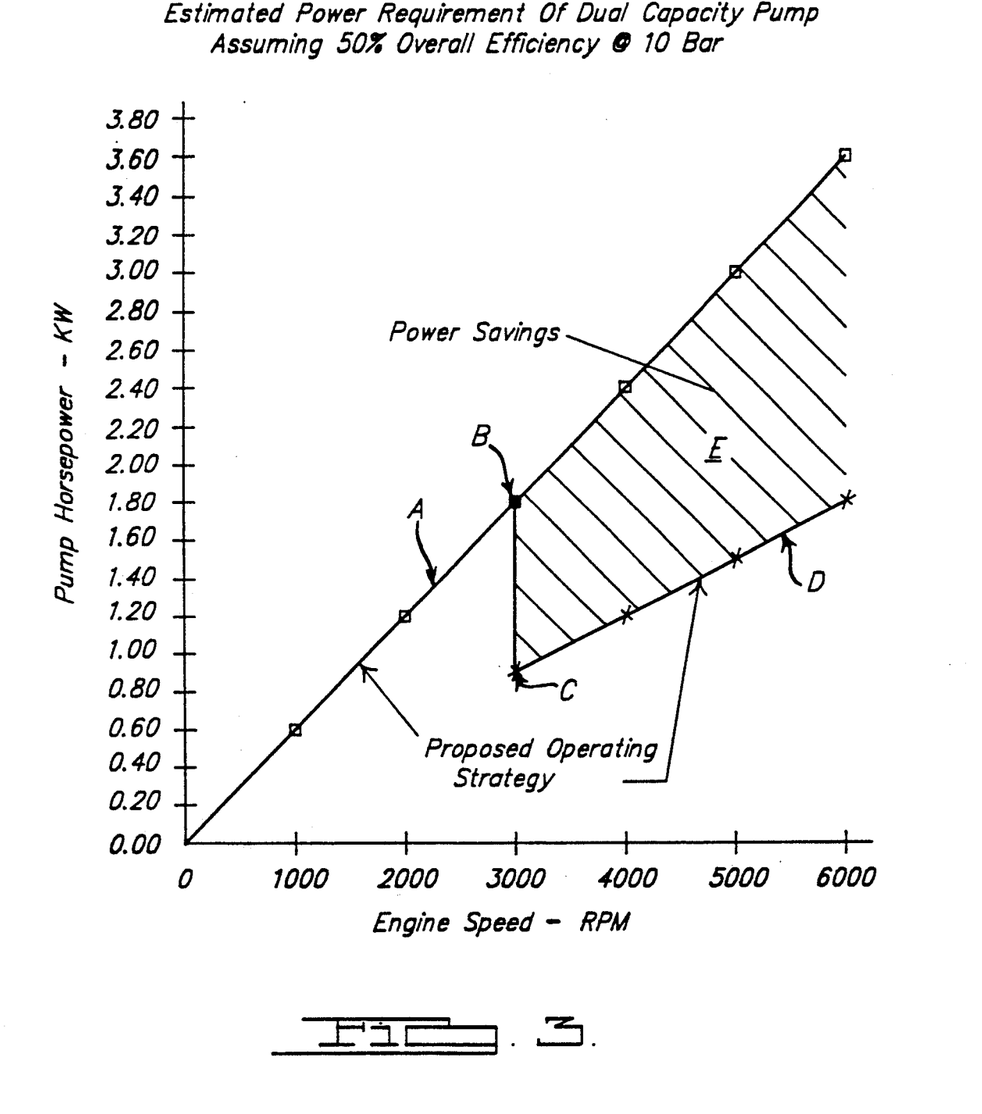
FIG. 3 is a chart showing the estimated power requirements for our dual capacity pump assuming a fifty percent overall pump efficiency at 10 atmospheres.

In FIGS. 3, we have shown an estimate of the power requirements for our improved dual capacity pump assuming a 50 percent overall pump efficiency at a pressure equal to 10 atmospheres. FIGS. 3 shows the relationship between pumping horsepower measured in kilowatts and engine speed. When both pumping stages are active, line A represents the linear pumping characteristics. The transition point for the change from the dual pumping mode to the single pumping mode is shown at B. After point B is reached, the pumping horsepower drops to a value indicated by symbol C. Thereafter, an increase in speed with only the single pumping stage active is represented by line D. Again, this relationship is generally linear, but it falls substantially below the corresponding portion of line A. Thus, the effective power savings is indicated by the shaded region E in FIG. 3.

While the best mode for carrying out the invention has been described in detail, those familiar with the art to which this invention relates will recognize various alternative designs and embodiments for carrying out the invention as defined by the following claims.

What we claim and desire to secure by U.S. Letters Patent is:

1. A dual capacity fluid pump comprising:
   first and second pairs of positive displacement pumping elements adapted for operation throughout a range of speeds;
   each of said pairs having a fluid inlet port and a fluid outlet port, the outlet port for said first pair communicating with a flow delivery passage for the pump;
   one-way flow valve means for establishing one-way communication between said outlet ports at low pump speeds whereby flow from the outlet port for said other pair is transferred to said delivery passage;

flow control valve means for establishing communication at high pump speeds between the inlet port and the outlet port of said other of said pairs of pumping elements and for interrupting said communication at low pump speeds;

a pump driven speed pressure signal generating means comprising a flow control pump having a fluid outlet port;

a signal passage communicating with said flow control pump outlet port and a control orifice means communicating with said signal passage for developing a speed pressure in said signal passage;

said flow control valve means communicating with said signal passage for establishing said communication between the inlet port and the outlet port of said other pair of pumping elements in response to an increase in said speed pressure signal.

2. The combination as set forth in claim 1 wherein said flow control pump comprises a pair of pump gears having an inlet port communicating with a low pressure fluid supply, said flow control valve means comprising a shuttle valve element with a speed pressure are thereon, means for biasing said shuttle valve element with a force opposing the force of said speed pressure;

said shuttle valve element having spaced valve lands providing communication between said inlet and outlet ports of said other pair of pumping element as said shuttle valve element is shifted by said speed pressure.

3. The combination as set forth in claim 1 wherein said first and second pumping element pairs have a common pump gear, one element of each pumping element pair comprising a pump gear meshing with said common pump gear thereby forming two pumping stages.

4. In a dual capacity fluid pump assembly adapted to be driven at speeds within a range of speeds;

first and second positive displacement pumps, each pump having an inlet port and an outlet port, a pump delivery passage communicating with the outlet port of one of said pumps, and one-way flow valve means connecting the outlet port for the other of said pumps with said delivery passage at low speeds in said range of speeds, whereby the flow output of both of said pumps is supplied to said delivery passage at high driven speeds in said range of speeds;

pump driven speed responsive flow control valve means for connecting the inlet and outlet ports for said other pump at high driven speeds in said range of speeds;

a pump driven speed pressure signal generating means comprising a flow control pump having a fluid outlet port;

a signal passage communicating with said flow control pump outlet port and a control orifice means communicating with said signal passage for developing a speed pressure in said signal passage;

said flow control valve means communicating with said signal passage for establishing said communicating between the inlet port and the outlet port of said other pair of pumping elements in response to an increase in said speed pressure signal.

5. The combination as set forth in claim 4 wherein said flow control pump comprises a pair of pump gears having an inlet port communicating with a low pressure fluid supply, said flow control valve means comprising a shuttle valve element with a speed pressure area thereon, a valve spring acting on said shuttle valve element;

said shuttle valve element having spaced valve lands providing communication between said inlet and outlet ports of said other pair of pumping elements as said shuttle valve element is shifted by 6. The combination as set forth in claim 4 wherein said first and second pumps have a common pump gear, one element of each pump comprising a pump gear meshing with said common pump gear thereby forming two pumping stages.

7. A dual capacity fluid pump for use in a fluid pressure control system for a power transmission mechanism adapted for torque delivery from an engine to traction wheels in a vehicle driveline comprising:

first and second pairs of positive displacement pumping elements adapted for operation throughout a range of speeds;

each of said pairs having a fluid inlet port and a fluid outlet port, the outlet port for said first pair communicating with a flow delivery passage for the pump;

means for generating a pressure signal that is dependant upon the magnitude of an operating variable for said driveline that is independent of pump fluid delivery;

one-way flow valve means for establishing one-way communication between said outlet ports whereby flow from the outlet port for said other pair is transferred to said delivery passage;

flow control valve means responsive to changes in the magnitude of said operating variable for establishing communication between the inlet port and the outlet port of said other pair of pumping elements when said operating variable has one calibrated value and for interrupting said communicating when said operating variable has another calibrated value, said pressure signal generating means comprises a pressure signal passage communicating with said flow delivery passage and with said flow control valve means, an exhaust port communicating with said signal passage, and solenoid operating valve means including a valve element adapted to open and close said exhaust port, said solenoid operated valve means responding to changes in said operating variable to actuate said valve element.

8. In a dual capacity fluid pump for use in a driveline adapted for torque delivery from an engine to traction wheels to be driven at speeds within a range of speeds;

means for generating a pressure signal that is dependent upon the magnitude of an operating variable for said driveline that is independent of pump fluid delivery;

first and second positive displacement pumps, each pump having a pair of pumping elements and inlet and outlet ports, a pump delivery passage communicating with the outlet port of one of said pumps, and one-way flow valve means connecting the outlet port for the other of said pumps with said delivery passage when said operating variable has one calibrated value, whereby the flow output of both of said pumps is supplied to said delivery passage;

flow control valve means for connecting the inlet and outlet ports for said other pump when said operating variable has another calibrated value, said pressure signal generating means comprises a pressure signal passage communicating with said flow delivery passage and with said flow control valve means, an exhaust port communicating with said signal passage, and solenoid operating valve means including a valve element adapted to open and close said exhaust port, said solenoid operated valve means responding to changes in said operating variable to actuate said valve element.

* * * * *

UNITED STATES PATENT AND TRADEMARK OFFICE
CERTIFICATE OF CORRECTION

PATENT NO. : 5,087,177

DATED : February 11, 1992

INVENTOR(S) : William J. Haley, et al

It is certified that error appears in the above-identified patent and that said Letters Patent is hereby corrected as shown below:

Column 8, line 32, delete "FIGS." and substitute --FIG.--.

Column 8, line 34, delete "FIGS." and substitute --FIG.--.

Column 9, line 22, Claim 2, delete "are" and substitute --area--.

Column 10, line 6, Claim 5, after "by" insert --said speed pressure against the force of said valve spring.--.

Signed and Sealed this

Twenty-fifth Day of May, 1993

Attest:

MICHAEL K. KIRK

Attesting Officer

Acting Commissioner of Patents and Trademarks